No. 725,790. PATENTED APR. 21, 1903.
E. S. STIMPSON.
FILLING REPLENISHING MECHANISM FOR LOOMS.
APPLICATION FILED FEB. 2, 1903.
NO MODEL.
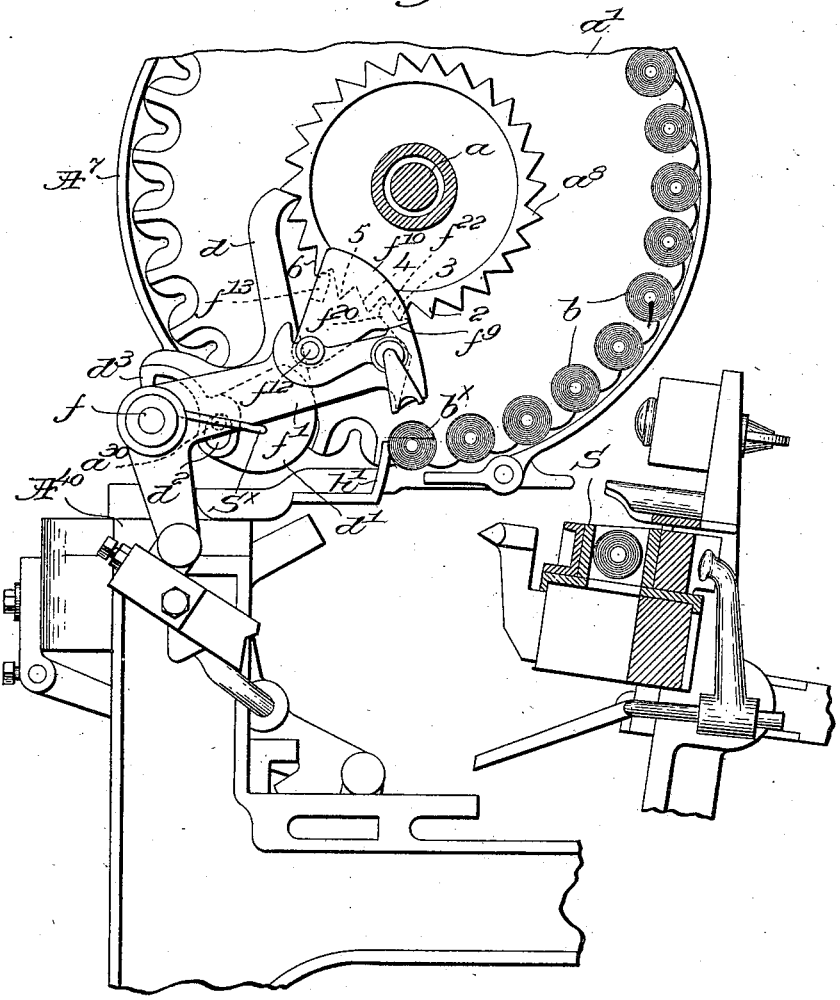
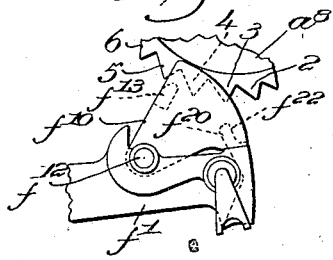
Witnesses,
Edward G. Allen.
W. C. Lunsford.
Inventor,
Edward S. Stimpson,
by Dunsby & Gregory.
attys.

UNITED STATES PATENT OFFICE.

EDWARD S. STIMPSON, OF HOPEDALE, MASSACHUSETTS, ASSIGNOR TO DRAPER COMPANY, OF HOPEDALE, MASSACHUSETTS, A CORPORATION OF MAINE.

FILLING-REPLENISHING MECHANISM FOR LOOMS.

SPECIFICATION forming part of Letters Patent No. 725,790, dated April 21, 1903.

Application filed February 2, 1903. Serial No. 141,515. (No model.)

*To all whom it may concern:*

Be it known that I, EDWARD S. STIMPSON, a citizen of the United States, and a resident of Hopedale, county of Worcester, State of Massachusetts, have invented an Improvement in Filling-Replenishing Mechanism for Looms, of which the following description, in connection with the accompanying drawings, is a specification, like characters on the drawings representing like parts.

This invention relates to that type of filling-replenishing loom wherein the filling-supplies are held in a movable feeder which is moved intermittingly to bring the filling-supplies one by one into position to be transferred to the running shuttle. Various means have been devised for effecting the movement of the feeler, such as by an intermittingly-wound spring in United States Patent No. 529,940, the stoppage of such movement being effected through the filling-supply next to be removed. Following this apparatus other means were devised, as in United States Patent No. 651,715, where a light spring started the movement and the transferrer completed it, and later a pawl on the transferrer moved the feeder, as in United States Patent No. 664,790, the stoppage of the feeder being effected by the impact of the endmost filling-supply against a fixed stop. Still later, Patent No. 710,023 disclosed means to positively lock the feeder between successive transferring operations, initiated the advance of the feeder by a light spring rendered active by operative movement of the transferrer, and completed the movement of the feeder positively as the transferrer resumed its normal position, stopping the feeder independently of the filling-supplies. Such feeder actuation is effective and overcomes the objectionable feature of stopping the feeder by or through a filling-supply.

My present invention also provides for a positive and definite stoppage of the filling feeder or holder independently of the filling-carriers, advances the feeder positively, and retains it locked under normal circumstances. I have, however, eliminated altogether the light spring referred to in the patent last mentioned and have made the control of the feeder and its movement positive throughout, the advance of the feeder being effected substantially as in Patent No. 664,790, while its stoppage is effected similarly to Patent No. 710,023.

The means for controlling the feeder in the present embodiment of my invention is mounted upon or carried by the transferrer and in itself locks the feeder from forward or backward movement under normal conditions. I have provided separate means, however, to prevent retrograde movement of the feeder when unlocked and during the operative movement of the transferrer, so that no jarring or vibration of the loom can have any improper effect upon the feeder.

The construction is very simple, the operation direct, positive, and accurate, and each transferring operation causes a definite advance movement of the filling feeder or holder.

The various novel features of my invention will be described hereinafter in the subjoined specification, and particularly pointed out in the following claims.

Figure 1 is a transverse sectional view of a portion of a loom having one embodiment of my invention applied thereto, taken through the axis and between the end plates or disks of the filling-feeder, the replenishing mechanism being shown in normal position; and Fig. 2 is a detail of a part of the transferrer and the means for controlling the feeder, the latter being shown unlocked as the transferrer operates.

The filling feeder or holder comprising two connected disks mounted rotatably on a stud $a$, projecting horizontally from a stand $A^7$ on the breast-beam $A^{40}$, the filling supplies or carriers $b$, supported by the disks, one of which, as $a'$, is herein shown, the transferrer $f'$, fulcrumed on a fixed stud $f$ and adapted to remove the filling-carriers one by one from the feeder to the shuttle S, the fixed abutment $h'$, against which the endmost filling-carrier $b^\times$ moves when transferred, and the means for operating the transferrer may be and are all substantially as in United States Patent No. 710,023 referred to, the transferrer being returned to normal position by a spring $S^\times$, Fig. 1, in well-known manner.

A toothed disk or ratchet-wheel $a^8$, rotatable with the feeder and located at the inner side of disk $a$, has teeth which in practice correspond in number to the holding devices for the filling-carriers, the latter being shown in Fig. 1 as circularly arranged relatively to the axis of the feeder.

The transferrer $f'$ has at its free end a lateral projection $f^9$, which supports a pawl-carrier $f^{10}$, fulcrumed on the transferrer at $f^{12}$ and provided with a pawl $f^{13}$, which coöperates with the toothed disk $a^8$, and in Fig. 1 the normal position of the parts is shown, the transferrer being in its highest position and the pawl in engagement with a tooth, as 6, of the disk. At such time the pawl acts to prevent retrograde movement of the feeder unless force enough be used to flex the transferrer-spring $S^\times$ and depress the transferrer. To prevent such forcible retrogression, however, I have provided a detent-pawl $d$, upturned and bent at its upper end to engage the disk $a^8$ and enlarged at its lower end, as at $d'$, said pawl having an elongated upright slot $d^2$ to receive a stud $a^{30}$, extended laterally from the stand $A^7$. The heavy end of the detent-pawl normally maintains it in the position shown in Fig. 1, said pawl having a tail $d^3$, which projects over and rests upon the hub of the transferrer. Manifestly any retrograde movement of the feeder will be resisted by the detent-pawl, while upon the advance movement of the feeder the pawl will click over the teeth of the disk $a^8$ and fall into operative position when such movement ceases.

The transferrer has secured to or forming part of it at its free end an upturned dog $f^{20}$ between the pawl-carrier $f^{10}$ and the disk $a'$ and adapted to engage the toothed disk $a^8$ when the transferrer is in normal position, as shown in Fig. 1.

At such time the rear face $f^{22}$ of the dog engages or rests against the outer face of a tooth, as 3, of the disk $a^8$ and manifestly at such time the feeder cannot move forward. When the parts are in this position, the feeder is locked, with a filling-carrier in position to be transferred at the next operation of the transferrer, such a filling-carrier being indicated at $b^\times$, Fig. 1. When a filling-carrier is to be transferred to the shuttle, the transferrer is depressed to engage the endmost filling-carrier of the series in well-known manner, and on such operative movement of the transferrer the dog $f^{20}$ is withdrawn from the disk $a^8$, unlocking the feeder. At the same time the weight of the pawl-carrier $f^{10}$ causes it to follow the descent of the transferrer, while the pawl $f^{13}$ clicks over the ratchet-teeth to be set in readines for a fresh hold.

By reference to Fig. 2 it will be seen that the pawl has left the tooth 6 and has passed below the next tooth, as 5, in readiness to engage it on the next upward movement of the pawl, the face of tooth 3 having been last engaged by the dog $f^{20}$ prior to operative movement of the transferrer. The filling-carrier having been inserted in the shuttle, the transferrer rises on its return movement, and the shelf or projection $f^9$ positively raises the pawl-carrier $f^{10}$, so that through engagement of the pawl $f^{13}$ with tooth 5 the disk $a^8$ and feeder will be advanced. Such advance of the feeder will carry the tooth 3 to the left of the dog $f^{20}$ before the latter is elevated into its path, and as the transferrer reaches the position shown in Fig. 1 the dog $f^{20}$ will be in readiness to engage the face of the tooth 2 and positively stop the feeder. Thus the latter has been advanced positively and stopped positively after a predetermined advance by the means described upon return movement of the transferrer and locked from movement when stopped, as hereinbefore pointed out.

The predetermined or definite advance movement is of such extent that the next filling-carrier of the series in the feeder is brought into accurate position to be transferred; but while such filling-carrier will be stopped adjacent or even in contact with the abutment $h'$ the filling-carrier has no part whatever in stopping the feeder.

Should one or more of the holding devices of the feeder be empty, owing to carelessness or oversight in filling the feeder, then the hereinbefore-described operation will act to bring such empty device into position just as if a filling-carrier were present, there being no overrunning of the feeder permitted or possible in the construction herein illustrated, each definite advance of the feeder following an operative movement of the transferrer.

Having fully described my invention, what I claim as new, and desire to secure by Letters Patent, is—

1. A movable filling-feeder to hold a series of filling-carriers, a transferrer, and means carried thereby to coöperate with and normally lock the feeder from movement and to release it upon operative movement of the transferrer, return movement of the latter acting through said means to first advance the feeder positively and thereafter to stop and lock it when a predetermined advance has been effected.

2. A movable filling-feeder to hold a series of filling-carriers, a transferrer, means carried thereby to coöperate with and normally lock the feeder from movement and to release it upon operative movement of the transferrer, return movement of the latter acting through said means to first advance the feeder positively and thereafter to stop and lock it when a predetermined advance has been effected, and a separate device to prevent retrograde movement of the feeder when unlocked.

3. A movable filling-feeder to hold a series of filling-carriers, a transferrer, and means mounted wholly upon the transferrer to coöperate positively and directly with and to normally lock the feeder from movement, the transferrer on its operative movement acting through said means to release the feeder and upon its return movement acting through said means to first advance the feeder positively a predetermined extent and then to stop and lock it independently of the filling-carriers.

4. A movable filling-feeder to hold a series of filling-carriers, a transferrer, and means carried thereby to govern the movement of the feeder, said means including two members which normally coöperate simultaneously with the feeder to lock it from movement, operative movement of the transferrer disengaging one member and unlocking the feeder, the return movement of the transferrer causing said members to coöperate successively with the feeder, to first advance it and then to stop and lock it at the termination of such advance movement.

5. A movable filling-feeder to hold a series of filling-carriers, a transferrer, and means carried thereby to govern the movement of the feeder, said means including two members which normally coöperate simultaneously with the feeder to lock it from movement, one member being fixed upon and the other member movable relatively to the transferrer, operative movement of the latter disengaging the fixed member and unlocking the feeder, the return movement of the transferrer first causing the relatively movable member to coöperate with and advance the feeder and thereafter bringing the fixed member into engagement with the feeder, to thereby stop and lock it.

6. A movable filling-feeder to hold a series of filling-carriers, means independent of the filling-carriers to normally lock the feeder from movement, and a transferrer, operative movement thereof releasing the feeder, the return movement of the transferrer acting through said means to advance the feeder a predetermined amount and to then stop and again lock the feeder, all independently of the filling-carriers.

7. A movable filling-feeder to hold a series of filling-carriers, means independent of the filling-carriers to normally lock the feeder from movement, a transferrer, operative movement thereof releasing the feeder, the return movement of the transferrer acting through said means to advance the feeder a predetermined amount and to then stop and again lock the feeder, and an independent detent to prevent retrogression of the feeder during operative movement of the transferrer.

8. A rotatable filling-feeder to hold a circularly-arranged series of filling-carriers, a transferrer, and means governed thereby to normally lock the feeder from movement, operative movement of the transferrer acting through said means to unlock the feeder, the return movement of the transferrer causing said means to positively rotate the feeder and to stop it when it has been moved through a predetermined arc, all independently of the filling-carriers.

9. A step-by-step rotatable filling-carrier adapted to contain a plurality of circularly-arranged filling-supplies, a transferrer to remove the latter one by one, means carried by said transferrer to normally lock the feeder, each operative movement of the transferrer unlocking the feeder, the return movement of the transferrer acting through said means to advance the feeder one step and to positively lock it at the completion of such advance step, and independent means to prevent retrogression of the feeder when unlocked by operative movement of the transferrer.

10. A rotatable filling-feeder to hold a circularly-arranged series of filling-carriers, an attached toothed disk, a transferrer, a pawl carried thereby to engage the disk and advance the feeder upon the return movement of the transferrer, and a dog on the transferrer to normally engage the disk, operative movement of the transferrer withdrawing the dog and unlocking the feeder and also positioning the pawl for the next advance of the feeder, the dog being brought into position to engage the disk and stop the advance of the feeder as the transferrer resumes its normal position.

11. A rotatable filling-feeder to hold a plurality of circularly-arranged filling-carriers, an attached toothed disk, a coöperating pawl having a rocking and a bodily movement, a transferrer on which the pawl is mounted, and a dog on the transferrer, the latter normally holding the pawl and dog in coöperation with the feeder to prevent its movement in either direction, operative movement of the transferrer withdrawing the dog to unlock the feeder and also setting the pawl, return movement of the transferrer acting through the set pawl to advance the feeder until the dog engages the disk and positively stops the advance.

12. A rotatable filling-feeder to hold a plurality of circularly-arranged filling-carriers, an attached toothed disk, a coöperating pawl having a rocking and a bodily movement, a transferrer on which the pawl is mounted, a dog on the transferrer, the latter normally holding the pawl and dog in coöperation with the feeder to prevent its movement in either direction, operative movement of the transferrer withdrawing the dog to unlock the feeder and also setting the pawl, return movement of the transferrer acting through the set pawl to advance the feeder until the dog engages the disk and positively stops the advance, and a detent to prevent retrogression of the unlocked feeder during setting of the pawl, the advance, stopping, and locking of the feeder being wholly independent of the filling-carriers.

13. A movable filling-supply holder, an attached toothed disk, a transferrer, means to move the holder, said means including a pawl and a dog carried by the transferrer and normally engaging the disk and preventing movement thereof in either direction, operative movement of the transferrer withdrawing the dog to release the feeder and setting the pawl, return movement of the transferrer acting first through pawl and disk to move the holder forward and then through dog and disk to stop such movement, and a separate device to coöperate with the disk and prevent retrogression of the holder during operative movement of the transferrer.

14. A rotatable filling-supply holder having an attached toothed disk, a pawl coöperating therewith, a transferrer on which the pawl is pivotally mounted, a dog on and rigid with the transferrer, to engage the disk when the transferrer is in normal position and prevent advance of the holder, operative movement of the transferrer withdrawing the dog and effecting setting of the pawl, and a detent to prevent retrograde movement of the holder when the pawl is set, return movement of the transferrer causing the set pawl to advance the holder until stopped by reëngagement of the disk and dog.

15. A rotatable filling-feeder adapted to hold a series of circularly-arranged filling-carriers, an attached disk notched to correspond to the angular position of the filling-carriers, a transferrer provided with a dog to normally enter a notch of the disk and lock the feeder from advance, and a pawl mounted on the transferrer and normally engaging the disk to oppose retrogression of the feeder, operative movement of the transferrer withdrawing the dog from the disk and also setting the pawl to engage the next notch of the disk, return of the transferrer causing the pawl to advance the feeder one step and effecting reengagement of the dog and disk to stop the feeder at the completion of the advance step.

In testimony whereof I have signed my name to this specification in the presence of two subscribing witnesses.

EDWARD S. STIMPSON.

Witnesses:
GEORGE OTIS DRAPER,
C. H. DRAPER.